United States Patent
Tanabe et al.

(10) Patent No.: US 6,460,877 B2
(45) Date of Patent: Oct. 8, 2002

(54) AIRBAG

(75) Inventors: Choko Tanabe; Eisiti Nakamura; Toshinori Tanase; Takashi Yamamoto; Mikihito Ishii; Yoshinari Takei, all of Aichi-ken (JP)

(73) Assignee: Toyoda Goseki Co., Ltd., Aichi-ken (JP)

( * ) Notice: Subject to any disclaimer, the term of this patent is extended or adjusted under 35 U.S.C. 154(b) by 0 days.

(21) Appl. No.: 09/793,712

(22) Filed: Feb. 27, 2001

(65) Prior Publication Data

US 2001/0026066 A1 Oct. 4, 2001

(30) Foreign Application Priority Data

Mar. 23, 2000 (JP) ........................................ 2000-081908
Mar. 30, 2000 (JP) ........................................ 2000-094708

(51) Int. Cl.[7] ............................ B60R 21/22; B60R 21/24
(52) U.S. Cl. ...................................... 280/729; 280/730.2
(58) Field of Search ............................. 280/729, 730.2, 280/730.1, 743.1, 743.2, 728.1

(56) References Cited

U.S. PATENT DOCUMENTS

| 6,010,149 | A | * | 1/2000 | Riedel et al. | ............... 280/729 |
| 6,056,316 | A | * | 5/2000 | Yamaji et al. | ........... 280/730.2 |
| 6,168,191 | B1 | * | 1/2001 | Webber et al. | ........... 280/730.2 |
| 6,176,514 | B1 | * | 1/2001 | Einsiedel | ................ 280/730.2 |
| 6,199,898 | B1 | * | 3/2001 | Masuda et al. | ............. 280/729 |
| 6,231,073 | B1 | * | 5/2001 | White, Jr. | ................ 280/730.2 |
| 6,260,878 | B1 | * | 7/2001 | Tanase | .................... 280/730.2 |
| 6,312,010 | B1 | * | 11/2001 | Heigl | ...................... 280/730.2 |

FOREIGN PATENT DOCUMENTS

| JP | 11-321535 | 11/1999 |
| JP | 2000-6749 | 1/2000 |

* cited by examiner

Primary Examiner—Peter C. English
(74) Attorney, Agent, or Firm—Pillsbury Winthrop LLP (57) ABSTRACT

An airbag including an expansion part accommodating inflow of expansion gas to expand a peripheral wall, and linear joining portions arranged in a region of the expansion part and constituted by joining facing portions of the peripheral wall in a linear manner. The linear joining portions include a linear base, curved portions and swelling portions. Each of the curved portions is connected to the base and curvilinearly extends and bends toward the respective base thereof. The swelling portions are arranged at tip ends of the curved portions to smoothly connect outer peripheral edges thereof to outer peripheral edges of the curved portions. With this airbag, stress concentration is reduced around the swelling portions and the curved portions at the time of development and expansion. Thus, the linear joining portions can be arranged without causing breakage of the peripheral wall during development and expansion, and reduction in volume and expansion area held down as much as possible.

7 Claims, 9 Drawing Sheets

AIRBAG

BACKGROUND OF THE INVENTION

The present application claims priority to Japanese patent application of Tanabe et al., filed Mar. 23, 2000, No. 2000-081908, and Japanese patent application of Tanabe et al., filed Mar. 30, 2000, No. 2000-094708.

1. Field of the Invention

The invention relates to an airbag for use in a head protective airbag device mounted on a roof-side rail section of a motor car, an airbag device for lateral collision and mounted on a seat, and the like.

2. Description of Related Art

Conventionally, for example, with a head protective airbag device, an airbag is folded and received to extend over a door and a peripheral edge of an opening on windows on a vehicle-interior side. When an expansion gas inflows, the airbag is developed and expanded in a manner to cover the opening. The airbag is provided with an expansion section, which allows an expansion gas to inflow to thereby expand in a manner to separate a vehicle-interior side wall and a vehicle-exterior side wall from each other.

A plurality of linear connections are arranged in a region of the expansion section (see Japanese Patent Laid-Open No. 321535/1999). The linear connections join opposite portions of peripheral walls, which constitute the expansion section, to one another in a linear fashion. Such linear connections are arranged in order to make peripheral edges and a central portion of the expansion section substantially uniform in thickness. Further, with a head protective airbag device, the linear connections are arranged to make an airbag exert tensile forces in a longitudinal direction to prevent the airbag from moving outside the vehicle even when the airbag is subjected to pushing forces toward the outside of the vehicle.

However, if end portions of the linear connections are small in area, stress concentration is liable to occur on the end portions of the linear connections at the time of expansion of the expansion section. Thus if the end portions are small in area, peripheral walls, which constitute the expansion section in the vicinity of the end portions, are in some cases broken.

Therefore, the linear connections including the end portions are arranged in a wide dimension.

However, if all the linear connections including the end portions are arranged in a wide dimension, a volume of the expansion section, into which an expansion gas is caused to flow, and an expansion area decrease. That is, when the linear connections are formed to be wide, the cushioning quality of an airbag is influenced thereby.

SUMMARY OF THE INVENTION

There is a need to solve the above-mentioned problems and to provide an airbag capable of arranging linear connections without causing breakage of peripheral walls at the time of development and expansion, while holding down reduction of a volume and an expansion area.

Accordingly, an embodiment of the present invention provides an airbag comprising an expansion part permitting an expansion gas to inflow to expand a peripheral wall, and linear joining portions arranged in a region of the expansion part and constituted by joining facing portions of the peripheral wall in a linear manner. The linear joining portions comprise a base, curved portions and swelling portions. The base is arranged to be substantially linear. Each of the curved portions is connected to a respective base and curvilinearly extends from the respective base thereof. The swelling portions are arranged at tip ends of the curved portions to smoothly connect outer peripheral edges thereof to outer peripheral edges of the curved portions. And the linear joining portions are arranged in accordance with $B0<R2<R1$ is established where $B0$ is a widthwise dimension near portions of the base connected to the curved portions, $R1$ is a radius of curvature of the outer peripheral edges of the curved portions, and $R2$ is a radius of curvature of the outer peripheral edges of the swelling portions.

With the airbag according to the invention, end portions of the linear joining portions are formed in a manner to be made contiguous to the swelling portions through the curved portions from the substantially straight base. And the swelling portions connect outer peripheral edges thereof smoothly to the outer peripheral edges of the curved portions, and the outer peripheral edges of the swelling portions have a radius $R2$ of curvature greater than a width dimension $B0$ of the base. Therefore, stress concentration is reduced around the swelling portions when the expansion portions expand.

Also, the outer peripheral edges of the curved portions have a radius $R1$ of curvature larger than the radius $R2$ of curvature of the outer peripheral edges of the swelling portions. Therefore, stress concentration is reduced around the curved portions.

At the end portions of the linear joining portions, the swelling portions are made wide. However, inner peripheral edges of the curved portions, which connect the base and the swelling portions, are recessed to enable making small the curved portions and the base. Therefore, reduction in volume of the expansion portions can be held down as much as possible.

Accordingly, with the airbag according to the invention, the linear joining portions can be arranged without causing breakage of the peripheral wall at the time of development and expansion and with reduction in volume and expansion area held down as much as possible.

And it is desired that the portions of the base near the curved portions are arranged substantially in parallel to a main flow of the inflowing expansion gas, and the swelling portions are arranged offset from the base in directions substantially perpendicular to the main flow of the expansion gas.

With such constitution, the swelling portions do not directly interfere with a main flow of an expansion gas, and stress concentration can be reduced around the swelling portions. Therefore, it becomes possible to reduce an area of the linear joining portions as well as an area of the swelling portions on the end portions. And it becomes possible to further increase a volume and expansion area of the airbag.

Also, the swelling portions may be arranged offset from the base toward branching flow passages branching from the main flow passage, through which the main flow of the expansion gas flows.

With such constitution, the swelling portions do not further interfere with a main flow of an expansion gas, and stress concentration can be reduced around the swelling portions. Therefore, in this case, it becomes possible to reduce an area of the linear joining portions as well as an area of the swelling portions on the end portions. That is, it becomes possible to increase a volume and expansion area of the airbag.

Further, in the case where the airbag is formed by hollow-weaving, it is desired that a radius of curvature $R1$ of the outer peripheral edges of the curved portions is in the range of 15 to 100 mm, and a radius of curvature R2 of the outer peripheral edges of the swelling portions is in the range of 10 to 15 mm.

With an airbag constituted in such manner, the linear joining portions can be arranged with reduction in volume and expansion area held down as much as possible.

Incidentally, the radius R1 of curvature of the outer peripheral edges of the curved portions are below 15 mm, stress concentration is liable to occur around the curved portions at the time of expansion of the expansion part to cause the possibility of breakage of the peripheral wall at the time of expansion and development of the airbag. Also, when the radius R1 of curvature exceeds 100 mm, the degree of bending from the base decreases, so that the main flow of the expansion gas becomes liable to interfere with the swelling portions. And it is not preferable to lengthen the curved portions so as to avoid this, since the airbag is made small in volume and expansion area.

Also, the radius R2 of curvature of the outer peripheral edges of the swelling portions are below 10 mm, stress concentration is liable to occur around the swelling portions at the time of expansion of the expansion part to cause the possibility of breakage of the peripheral wall at the time of expansion and development of the airbag. Also, when the radius R2 of curvature exceeds 15 mm, stress concentration is reduced therearound. However, this is not preferable since the airbag is made small in volume and expansion area.

And in the case where there is a need of partially making the airbag compact when the airbag formed in hollow-weaving is to be folded for storage, the airbag may be constituted according to a second embodiment in the following manner.

More specifically, an airbag according to the second embodiment is folded and received in a peripheral edge of an opening on a vehicle-interior side and a body side and is developed and expanded in a manner to cover the opening when an expansion gas inflows. Also, the airbag comprises an expansion part and a thin-walled non-expansion part. The expansion part is constituted to comprise a vehicle-interior side wall portion and a vehicle-exterior side wall portion, and expands in a manner to separate the vehicle-interior side wall portion and the vehicle-exterior side wall portion from each other when the expansion gas is made to inflow. The thin-walled non-expansion part is made thinner than a sum of thicknesswise dimensions of the vehicle-interior side wall portion and the vehicle-exterior side wall portion to inhibit inflowing of the expansion gas. And the thin-walled non-expansion part together with the expansion part is formed into a bag shape by hollow-weaving with a portion of a bag-shaped peripheral wall cut off.

With the airbag according to the second embodiment, when the airbag is woven by hollow-weaving, the thin-walled non-expansion part together with the expansion part is formed in a bag-shape. Portions of the peripheral edge on the woven portion, which constitutes the thin-walled non-expansion part, are cut off to enable forming the thin-walled non-expansion part.

Incidentally, with the prior art, an airbag is manufactured by hollow-weaving, and a cloth material for a thin-walled non-expansion part is separately cut into a predetermined shape. And the cloth material for a thin-walled non-expansion part is joined to an airbag to manufacture the same (Japanese Patent Laid-Open No. 6749/2000). Therefore, such prior art airbag takes time in manufacture and involves an increase in manhour for manufacture and cost. In addition, the reason for formation of the thin-walled non-expansion part is to enable preventing the thin-walled non-expansion part from becoming bulky and interfering with a room lamp and an air-conditioning duct disposed about a peripheral edge of an opening when the airbag is to be folded.

With the airbag according to the second embodiment, however, only the cutting-off operation after hollow-weaving makes it possible to form a thin-walled non-expansion part to simply manufacture an airbag.

Accordingly, even when provided with a thin-walled non-expansion part made thin in thickness, the airbag according to the second embodiment can be easily manufactured to be reduced in manhour for manufacture and cost.

With the above-mentioned airbag, it is desired that a thin-walled non-expansion part is constituted by a vehicle-interior side portion on a peripheral edge when the airbag is formed by hollow-weaving. This is because an cut off end portion on the thin-walled non-expansion part can be prevented from being exposed to a vehicle-exterior side at the time of development and expansion of the airbag. Therefore, it is possible to make feeling favorable even when an occupant contacts with the thin-walled non-expansion part.

It is desired that a method of manufacturing the airbag according to the second embodiment be as follows.

First, an airbag stock configured to comprise a product shape of the airbag and a cut-off hem on a peripheral edge of the product shape is woven by hollow-weaving. Also, at the time of hollow-weaving, a spare bag-shaped portion, which is communicated to a woven portion of the thin-walled non-expansion part, is woven on the cut-off hem.

Then, at the time of cutting-off of the cut-off hem, the spare bag-shaped portion is cut off to form an opening on the woven portion of the thin-walled non-expansion part.

Thereafter a cutting jig is inserted into the woven portion of the thin-walled non-expansion part from the formed opening to cut off a portion of the peripheral wall, thus enabling manufacturing an airbag.

With the above-mentioned method, at the time of hollow-weaving, a spare bag-shaped portion, which is communicated to a woven portion of the thin-walled non-expansion part, is woven on the cut-off hem. Therefore, at the time of cutting-off of the cut-off hem, the spare bag-shaped portion is cut off to form an opening on the woven portion of the thin-walled non-expansion part. And a cutting jig can be inserted into the woven portion of the thin-walled non-expansion part from the opening to cut off a portion of the peripheral wall on the woven portion of the thin-walled non-expansion part.

Accordingly, the manufacturing method of the present invention makes it possible to more simply form thin-walled non-expansion part.

Other features and characteristics of the present invention, as well as the methods of operation of the invention and the function and interrelation of the elements of structure, will become more apparent upon consideration of the following description and the appended claims with reference to the accompanying drawings, all of which form a part of this disclosure.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

While the present invention will hereinafter be described in connection with at least one exemplary embodiment thereof, it should be understood that it is not intended to limit the invention to that embodiment. On the contrary, it is intended to cover all alternatives, modifications and equivalents as may be included within the spirit and scope of the invention as defined by the appended claims.

Figure 1:
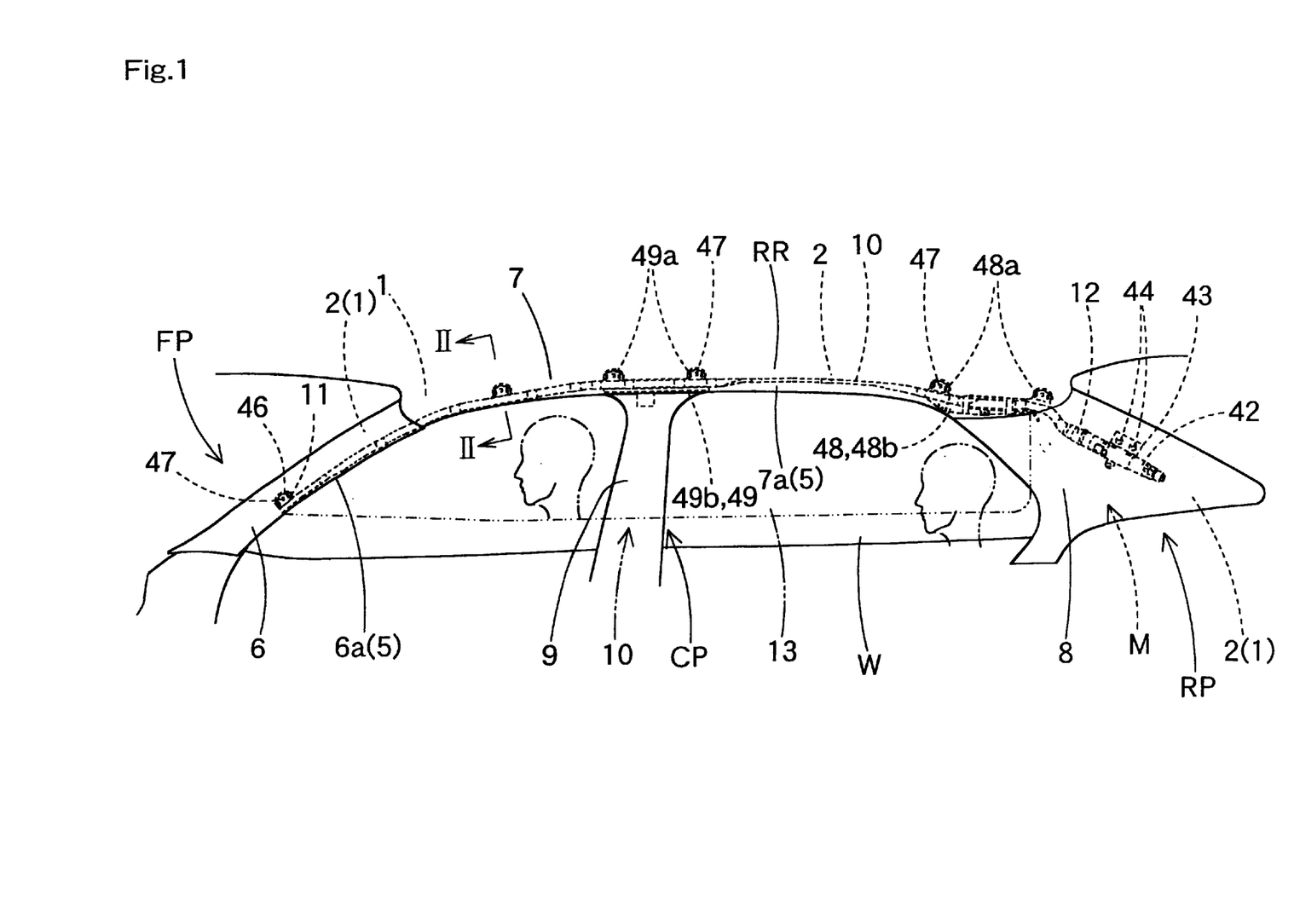
FIG. 1 is a schematic view showing a manner, in which a head protective airbag device using an airbag according to an embodiment of the invention is used.
Figure 2:
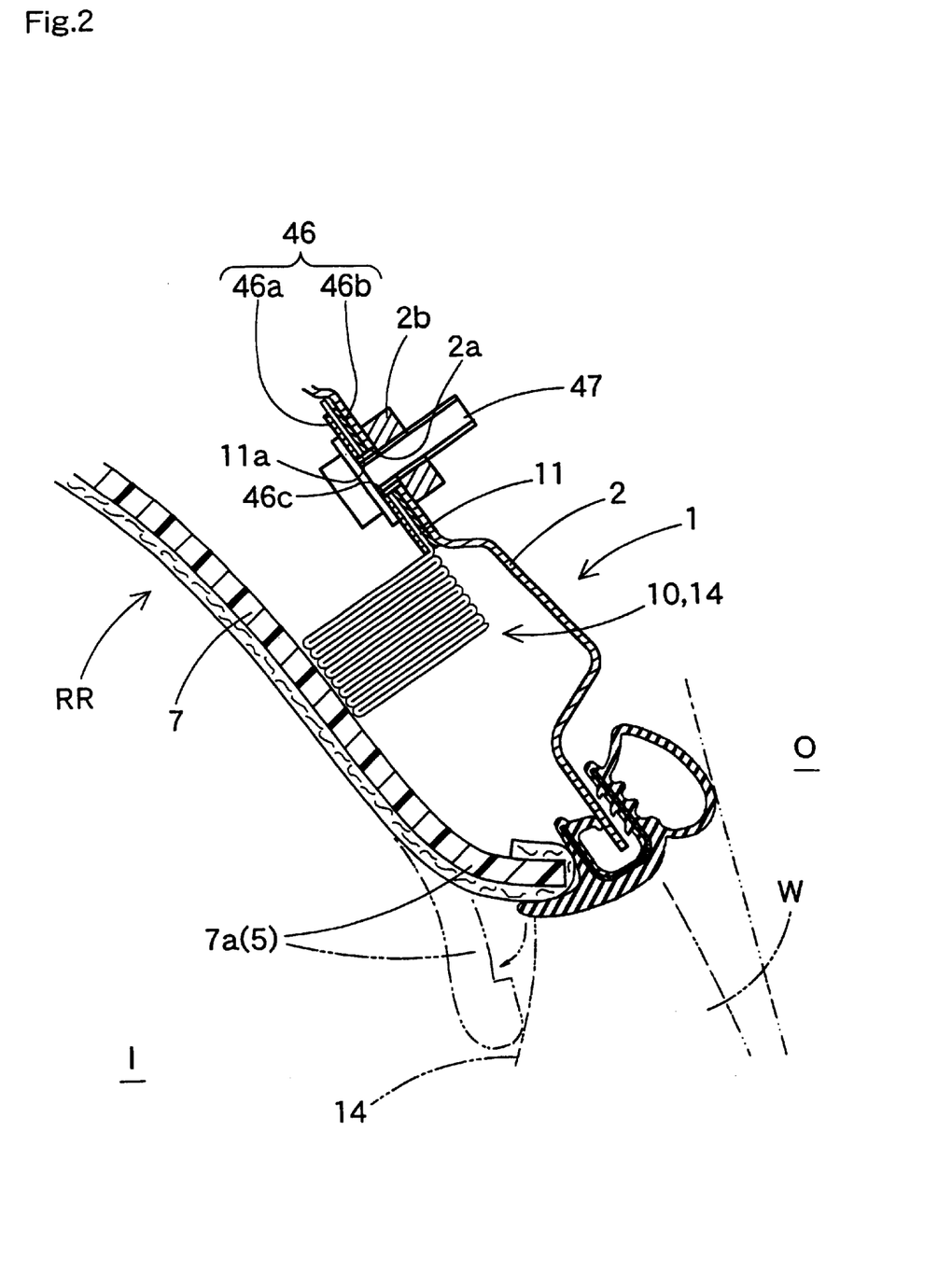
FIG. 2 is a schematic cross sectional view along the line II—II in FIG. 1.
Figure 3:
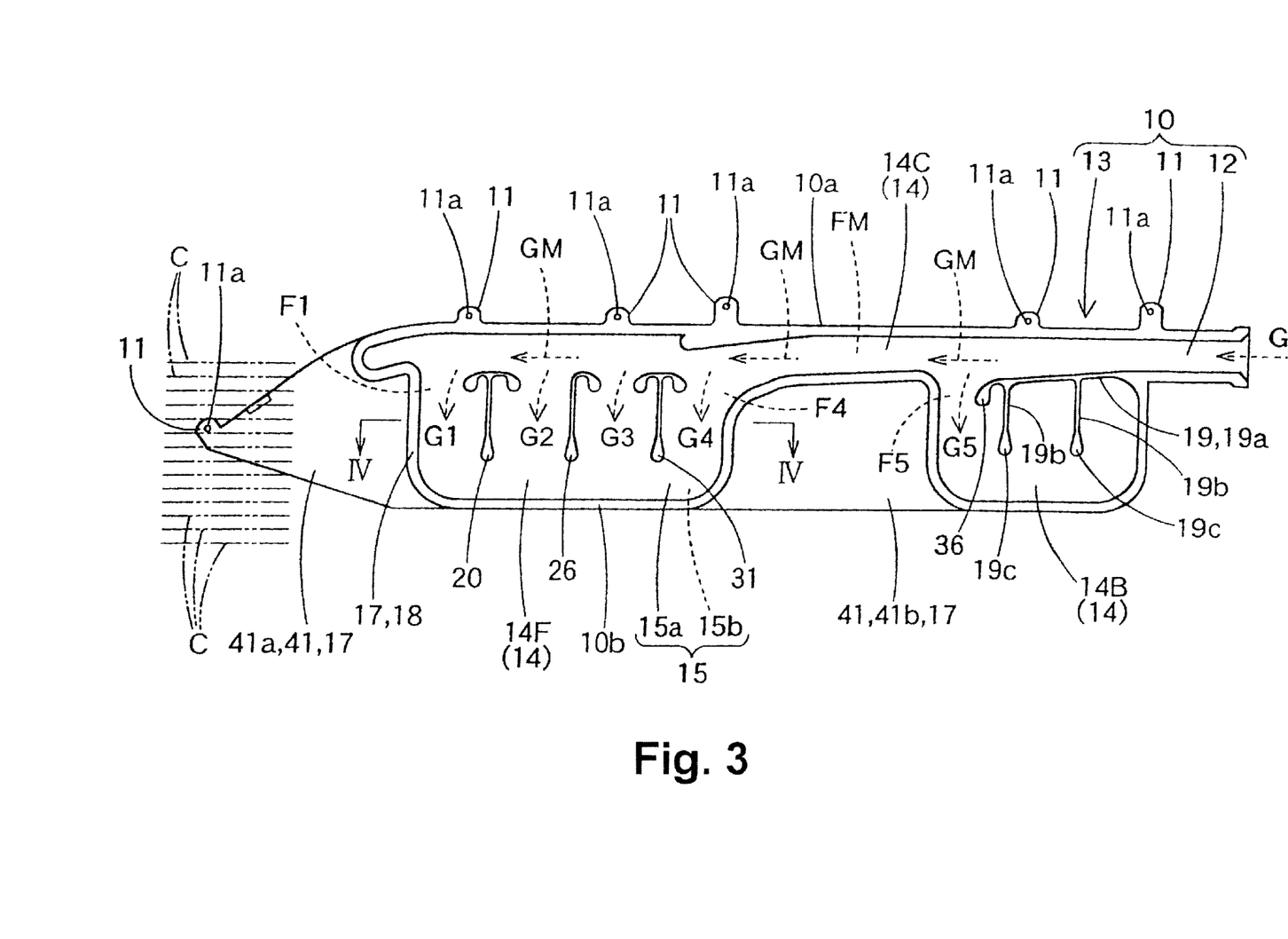
FIG. 3 is a front view showing a state, in which the airbag according to the embodiment expands singly.
Figure 4:
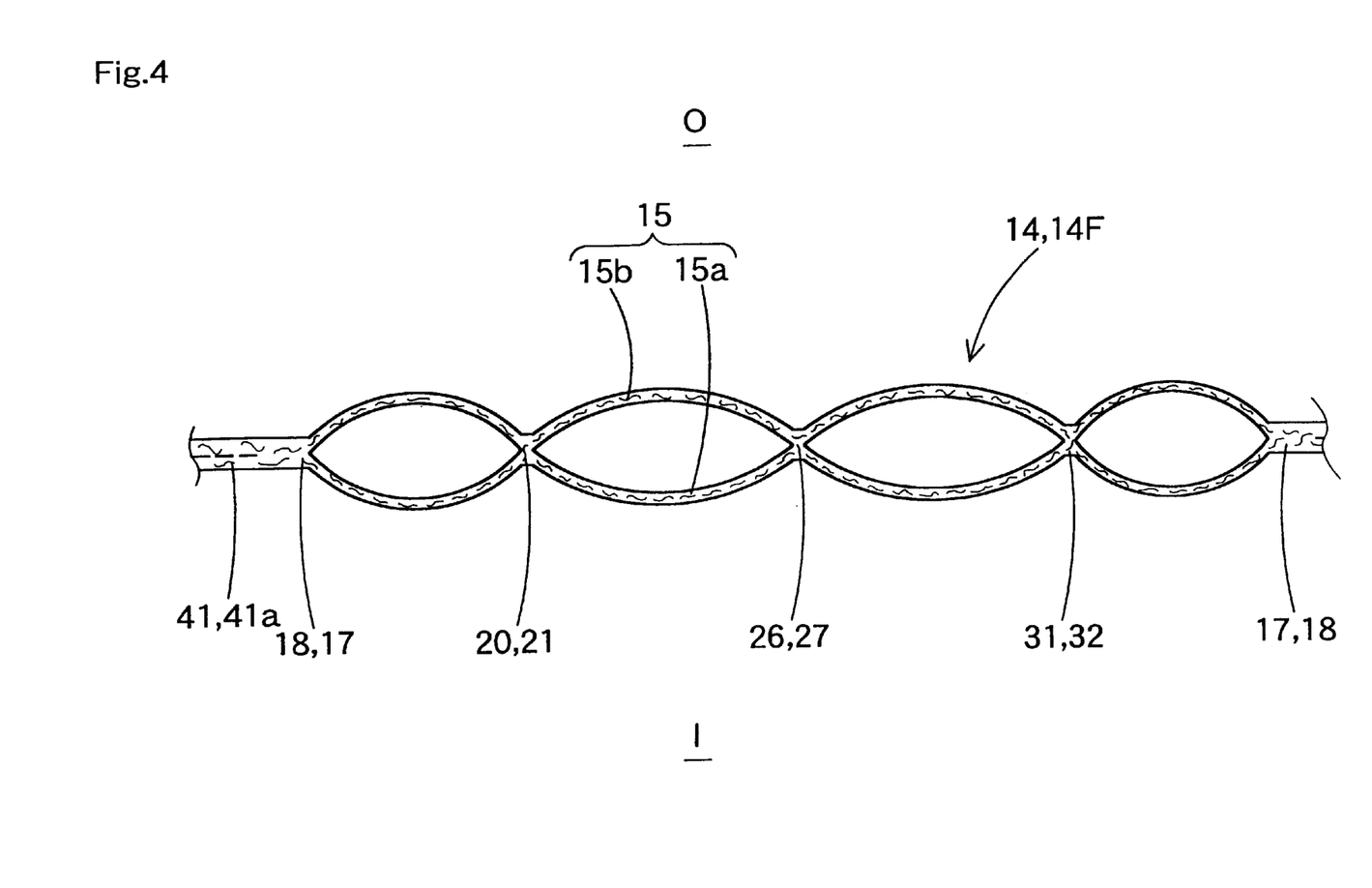
FIG. 4 is a cross sectional view along the line IV—IV in FIG. 3.

An airbag 10 according to an embodiment is used in a head protective airbag device M shown in FIGS. 1 and 2. The airbag 10 is folded and received to be arranged on a front pillar section FP, a roof-side rail section RR, and a rear pillar section RP on a door on a vehicle-interior side and on a peripheral edge of an opening W on windows.

The head protective airbag device M comprises an airbag 10, an inflator 42, mount brackets 43, 46, 48, 49, and an airbag cover 5.

The inflator 42 supplies an expansion gas to the folded airbag 10. The inflator 42 is of a cylinder type and mounts outside thereof a gas inflowing portion 12 described later.

The mount bracket 43 is formed of sheet metal and interposes from outer peripheral sides the inflator 42, on which the gas inflowing portion 12 of the airbag 10 is exteriorly mounted, as well as the gas inflowing portion 12. The bracket 43 makes use of two mount bolts 44 to mount the inflator 42 to an inner panel 2 of the rear pillar section RP on the vehicle-interior side. The inner panel 2 is formed of sheet metal and is a member on a side of a body 1.

The mount bracket 46 is formed of sheet metal as shown in FIGS. 1 and 2 and interposes pairs of mounts 11 on other portions of the airbag 10. The respective brackets 46, respectively, are provided with an inner plate 46a on the vehicle-interior side I and an outer plate 46b on the vehicle-exterior side O. A mount hole 46c extends through the inner and outer plate 46a, 46b to correspond to a mount hole 11a of the respective mounts 11. As shown in FIG. 2, a mount bolt 47 is inserted through the mount holes 46c, 11a to be threaded into a nut 2b, whereby the respective mounts 11 is mounted to the inner panel 2. The nut 2b is fixed to a peripheral edge of a mount hole 2a on the inner panel 2.

The mount brackets 48, 49 are formed of sheet metal as shown in FIG. 1 and interposes pairs of mounts 11 on other portions of the airbag 10. The brackets 48, 49, respectively, are provided with a pair of inner plates 48a, 49a arranged on the vehicle-interior side I in the same manner as the inner plate 46a on the mount bracket 46. Also, the brackets 48, 49, respectively, are provided with outer plates 48b, 49b. The outer plates 48b, 49b are formed by uniting to outer plate 46b of the mount bracket 46. The respective outer plates 48b, 49b support a vehicle-exterior side and an underside of the folded airbag 10. The respective outer plates 48b, 49b are substantially L-shaped in cross section so as to prevent the airbag 10 at the time of development and expansion from entering vehicle-exterior sides of a garnish 8 of the rear pillar section RP and a garnish 9 of the center pillar section CP. Also, mount holes (not shown) extend through the respective inner plates 48a, 49a and the respective outer plates 48b, 49b to be positioned corresponding to the mount holes 11a of the mounts 11.

The airbag cover 5 is composed of lids 6a, 7a. The lids 6a, 7a are disposed on lower edge sides of a pillar garnish 6 disposed on the front pillar section FP and of a roof head lining 7 disposed on the roof-side rail section RR.

The front pillar garnish 6 is formed of a synthetic resin to be mounted to the inner panel 2 of the body 1 on the vehicle-interior side of the front pillar section FP. The garnish 6 is provided at its lower edge side with the lid 6a. At the time of development and expansion, the lid 6a opens toward the vehicle-interior side to allow the airbag 10 to protrude.

The roof head lining 7 is formed of a synthetic resin as shown in FIGS. 1 and 2, and mounted to the inner panel 2 of the body 1 on the vehicle-interior side I of the roof-side rail section RR. The roof head lining 7 is provided at its lower edge side with the lid 7a. The lid 7a opens toward the vehicle-interior side I to allow the airbag 10 at the time of development and expansion to protrude.

The airbag 10 is provided, as shown in FIGS. 1 to 4, with an airbag body 13, the gas inflowing portion 12, and the mounts 11. The airbag body 13 permits an expansion gas to inflow, from the inflator 42, and thus develops from the folded state to cover the opening W. The gas inflowing portion 12 introduces into the airbag body 13 an expansion gas from the inflator 42. The mounts 11 are provided on a side of an upper edge 10a of the airbag body 13.

The gas inflowing portion 12 is formed in such a configuration that a peripheral edge joining portion 18 on an upper edge side of a communicating expansion section 14C described later and a compartment 19a of an extended joining portion 19 are extended rearward in a cylindrical fashion. The gas inflowing portion 12 is mounted on the inflator 42 from outside.

The mounts 11 are arranged in plural in a manner to protrude upward from the peripheral edge joining portion 18 on the side of the upper edge 10a of the airbag body 13. The respective mounts 11 secure thereto mount brackets 46, 48, 49 for mounting to the inner panel 2. Also, the respective mounts 11 are formed with the mount hole 11a for insertion of a mount bolt 47.

The airbag body 13 comprises an expansion part 14 and a non-expansion part 17. The expansion part 14 is in communication with the gas inflowing portion 12 to permit inflowing of an expansion gas for expansion. The non-expansion part 17 does not permit inflowing of an expansion gas.

In addition, the airbag body 13 as well as the mounts 11 and the gas inflowing portion 12 is integrally formed by means of hollow-weaving from polyamide yarn, polyester yarn or the like. Also, a vehicle-interior side wall portion 15a and a vehicle-exterior side wall portion 15b of a peripheral wall 15, described later, of the expansion portion 14, respectively, are woven by means of plain weaving where the number of yarns per square inch is 49 to 58 of warps and 49 to 58 of wefts (in the embodiment, warps are 56 and wefts are 50.5). Meanwhile, with the peripheral edge joining portion 18, the extended joining portion 19 and linear joining portions 20, 26, 31, 36 described later, the number of yarns per square inch is two times that on the vehicle-interior side wall portion 15a. Also, after being woven by hollow-weaving, the airbag 10 is manufactured by suitably providing a coating layer, to which silicone or the like is applied, for an increased heat-resisting quality and prevention of leakage of an expansion gas. Incidentally, the coating layer is formed on an outer peripheral side of the airbag 10 because any coating agent cannot be applied on an inner peripheral side of coating layer after the airbag has been woven.

The expansion part 14 is composed of a front-seat expansion portion 14F, a rear-seat expansion portion 14B, and a communicating expansion portion 14C. The front-seat expansion portion 14F is positioned on a front-seat side of a vehicle. The rear-seat expansion portion 14B is positioned on a rear-seat side of a vehicle. The communicating expansion portion 14C is communicated to the gas inflowing portion 12 and provides communication between upper portions of the front-seat expansion portion 14F and the rear-seat expansion portion 14B. The respective expansion portions 14F, 14B, 14C, respectively, are designed to be surrounded by the peripheral wall 15. The peripheral wall 15 is composed of the vehicle-interior side wall portion 15a and the vehicle-exterior side wall portion 15b.

The non-expansion part 17 is formed by joining the vehicle-interior side wall portion 15a and the vehicle-exterior side wall portion 15b to each other. Also, the non-expansion part 17 in the embodiment is composed of the peripheral edge joining portion 18, the extended joining portion 19, the linear joining portions 20, 26, 31, 36, and a plate-shaped joining portion 41. The peripheral edge joining portion 18 is arranged in a manner to surround a peripheral edge of the expansion part 14. The extended joining portion 19 is composed of the compartment 19a and two longitudinal rod portions 19b. The compartment 19a extends forward from rearwardly of the peripheral edge joining portion 18 in a manner to have the communicating expansion portion 14C and the rear-seat expansion portion 14B compartmented. The respective longitudinal rod portions 19b are arranged to enter a region of the rear-seat expansion portion 14B from the compartment 19a.

The plate-shaped joining portion 41 is composed of a triangular-plate portion 41a and a rectangular-plate portion 41b. The triangular-plate portion 41a is disposed on a front side of the airbag body 13. The rectangular-plate portion 41b is disposed below the communicating expansion portion 14C between the front-seat and rear-seat expansion portions 14F, 14B. The plate-shaped joining portion 41 is arranged in order to reduce a volume of the expansion part 14 to shorten a time elapsed until the completion of expansion. Also, the plate-shaped joining portion 41 is arranged in order to ensure the entire configuration of the airbag body 13 extending over a front portion of the airbag body 13 from the gas inflowing portion 12.

The peripheral edge joining portion 18, the extended joining portion 19 and the linear joining portions 20, 26, 31, 36 are woven densely as compared with the plate-shaped joining portion 41. Meanwhile, the plate-shaped joining portion 41 is not disposed at a boundary between it and the expansion part 14, so that it is not necessary to take account of any measure for leakage of an expansion gas. Therefore, the plate-shaped joining portion 41 is constituted to be coarse.

Figure 5:
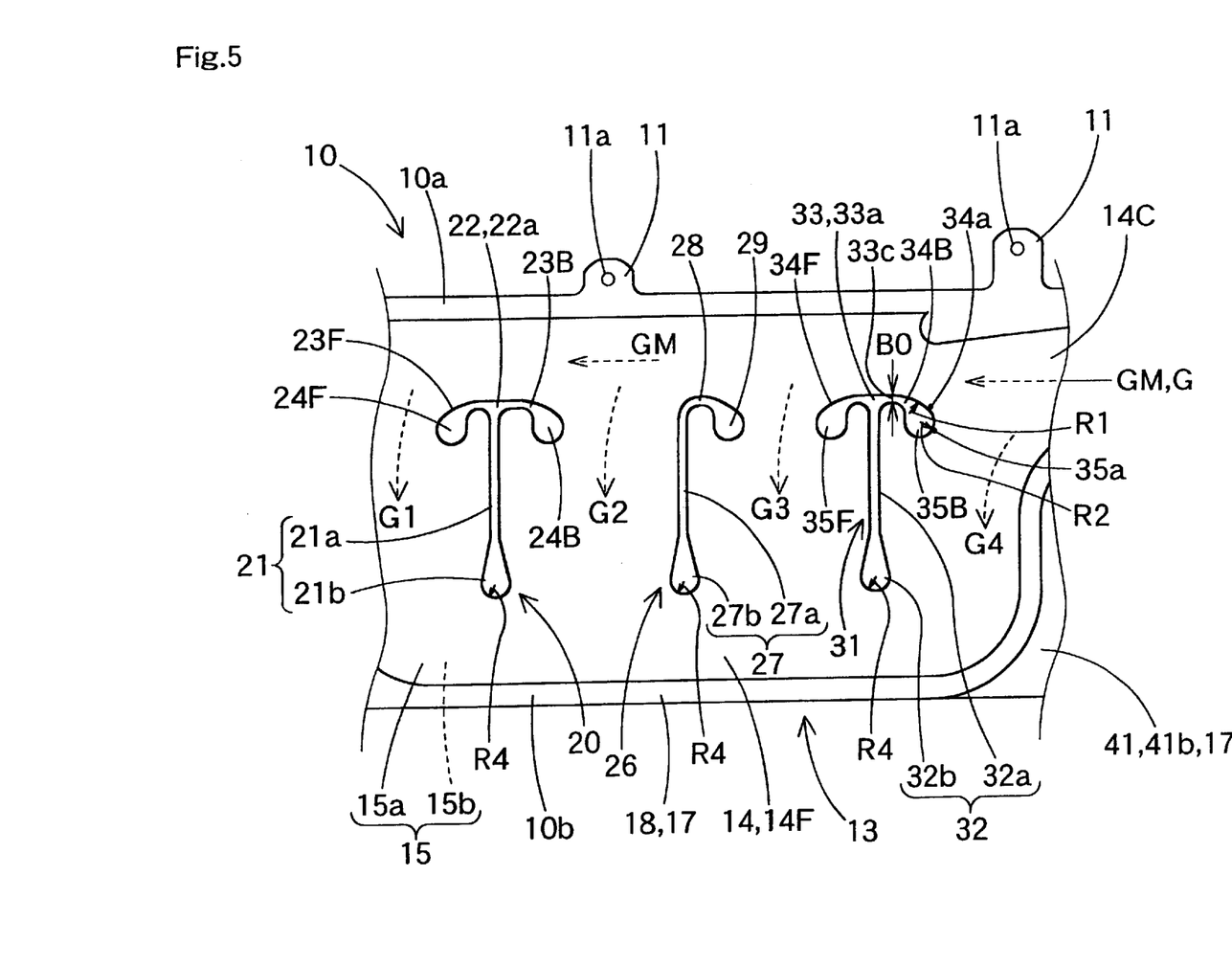
FIG. 5 is an enlarged, front view showing an expansion section for a front seat, in the airbag according to the embodiment.
Figure 6:
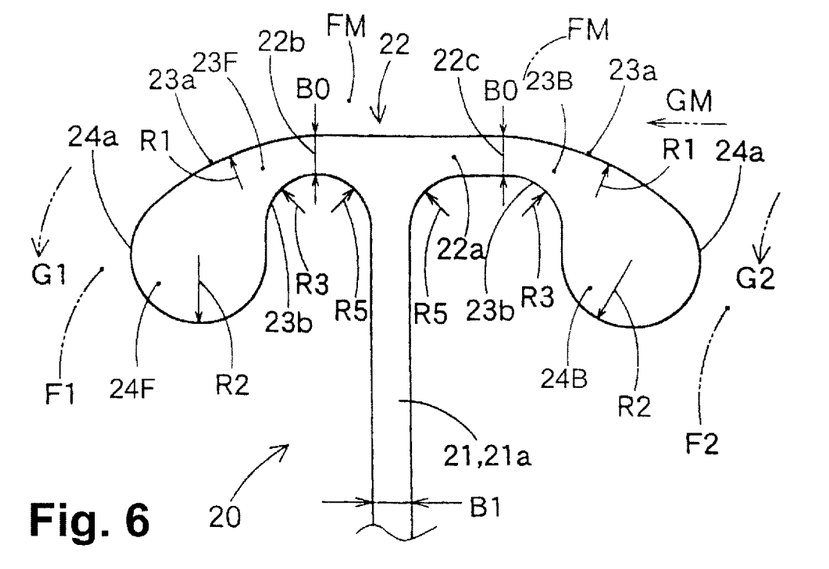
FIG. 6 is an enlarged view showing end portions of linear connections in the airbag according to the embodiment.
Figure 8:
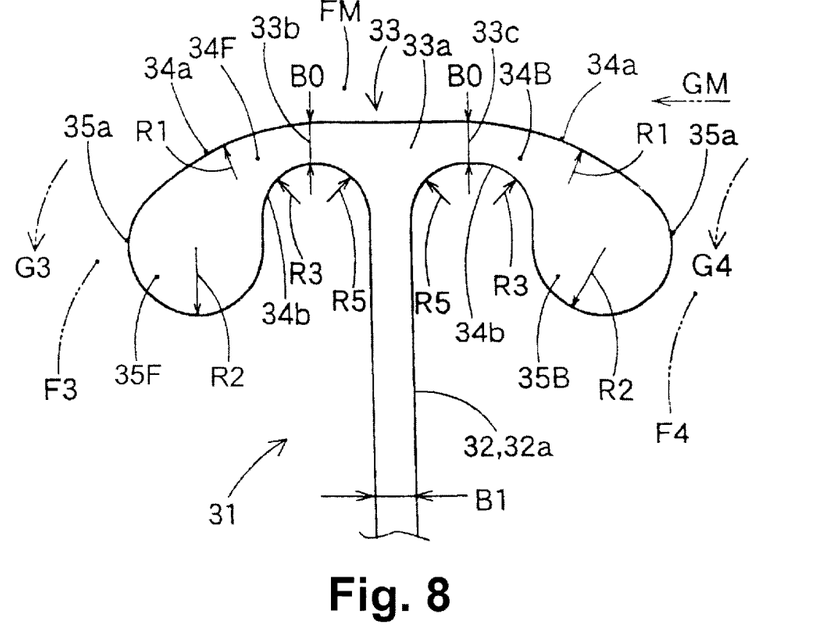
FIG. 8 is an enlarged view showing end portions of further linear connections in the airbag according to the embodiment.

The linear joining portions 20, 26, 31 are provided in a region of the front-seat expansion portion 14F to be distant from the peripheral edge joining portion 18. Likewise, the linear joining portion 36 is provided in a region of the rear-seat expansion portion 14B to be distant from the peripheral edge joining portion 18. Further, the linear joining portions 20, 31 are disposed on front and rear sides of the front-seat expansion portion 14F as shown in FIGS. 5, 6 and 8, and are T-shaped to be provided with longitudinal rod portions 21, 32 and lateral rod portions 22, 33, respectively. The linear joining portion 26 is disposed between the linear joining portions 20, 31 and is substantially I-shaped to be provided with a longitudinal rod portion 27. The linear joining portions 20, 26, 31, 36 are formed by joining the vehicle-interior side wall portion 15a and the vehicle-exterior side wall portion 15b to each other to form their respective T and I-shaped configurations. That is, the linear joining portions 20, 26, 31, 36 are constituted by joining facing portions (i.e., vehicle-interior side wall portion 15a and vehicle-exterior side wall portion 15b) of peripheral wall 15 in a linear manner.

In addition, an expansion gas G flowing into the gas inflowing portion 12 comprises a main flow GM, which flows forward in the communicating expansion portion 14C and further flows forward above the front-seat expansion portion 14F. Branching flows G1, G2, G3, G4, G5 branching from the main flow GM flow downward from between the peripheral edge joining portion 18, the linear joining portions 20, 26, 31, 36 and the extended joining portion 19 to expand the front-seat expansion portion 14F and the rear-seat expansion portion 14B.

The lateral rod portion 22 on the linear joining portion 20 and near the main flow GM of the expansion gas G comprises, as shown in FIG. 6, a base 22a, curved portions 23F, 23B and swelling portions 24F, 24B. The base 22a is linear substantially in parallel to the main flow GM in the vicinity of the longitudinal rod portion 21. The curved portions 23F, 23B, respectively, curve downward toward both tip ends in a longitudinal direction from both longitudinal tip ends 22b, 22c of the base 22a. The swelling portions 24F, 24B, respectively, are disposed on tip ends of the respective curved portions 23F, 23B to connect outer peripheral edges 23a, 24a thereof gently to the curved portions 23F, 23B. In addition, a starting point 22c where the curved portion 23B begins to curve from the base 22a is distant from and about the longitudinal rod portion 21 as compared with a starting point 22b where the curved portion 23F begins to curve from the base 22a.

Also, the lateral rod portion 33 on the linear joining portion 31 and near the main flow GM of the expansion gas G comprises, as shown in FIG. 8, a base 33a, curved portions 34F, 34B and swelling portions 35F, 35B. The base 33a is linear substantially in parallel to the main flow GM in the vicinity of the longitudinal rod portion 32. The curved portions 34F, 34B, respectively, are substantially left-right symmetric about the longitudinal rod portion 32. The curved portions 34F, 34B, respectively, curve downward toward both tip ends in a longitudinal direction from both longitudinal tip ends 33b, 33c of the base 33a. The swelling portions 35F, 35B, respectively, are disposed on tip ends of the respective curved portions 34F, 34B to connect outer peripheral edges 34a, 35a thereof gently to the curved portions 34F, 35B.

In addition, with the linear joining portion 31, a starting point 33c where the curved portion 34B begins to curve from the base 33a is slightly distant from and about the longitudinal rod portion 32 as compared with a starting point 33b where the curved portion 34F begins to curve from the base 33a.

Figure 7:
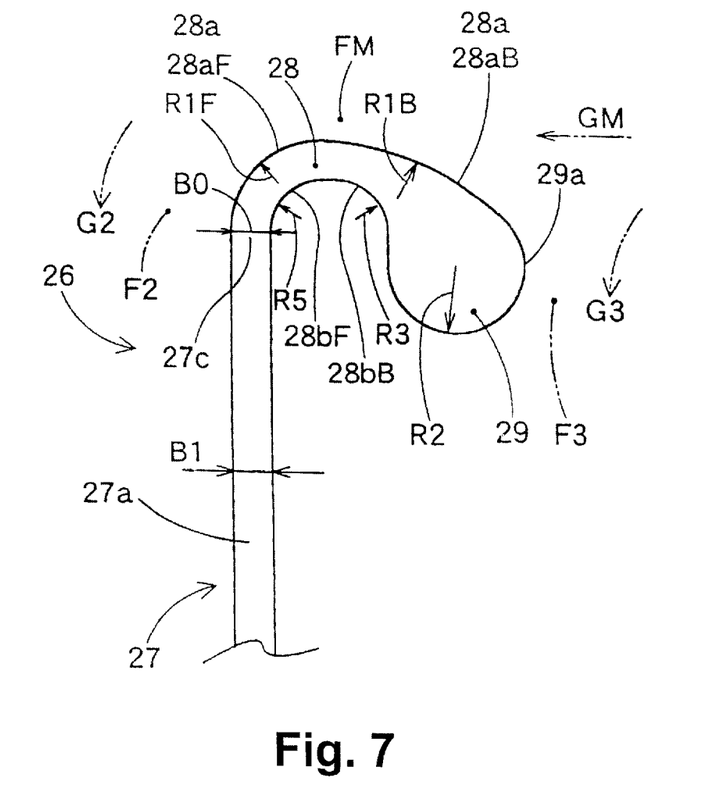
FIG. 7 is an enlarged view showing end portions of other linear connections in the airbag according to the embodiment.

The linear joining portion 26 comprises, as shown in FIGS. 5 and 7, the longitudinal rod portion 27, a curved portion 28 and a swelling portion 29. The curved portion 28 curves upward and rearward from an upper end 27c of the longitudinal rod portion 27 and further curves downward. The swelling portion 29 connects an outer peripheral edge 29a gently to an outer peripheral edge 28a of the curved portion 28. In addition, the outer peripheral edge 28a of the curved portion 28 is defined by two curves having different radii of curvature R1F, R1B. That is, the outer peripheral edge 28a is constituted by an outer peripheral edge 28aF on a front side and an outer peripheral edge 28aB on a rear side.

The respective parts in the embodiment are dimensioned such that the respective bases 22a, 33a, 27 have a width dimension B0 of 7 mm at portions thereof contiguous to the curved portions 23F, 23B, 28, 34F, 34B, the outer peripheral edges 23a, 28aF, 28aB, 34a of the curved portions 23F, 23B, 28, 34F, 34B have radii R1, R1B of curvature of 50 mm and a radius R1F of curvature of 17 mm, and the outer peripheral edges 24a, 29a, 35a of the swelling portions 24F, 24B, 29, 35F, 35B have a radius R2 of curvature of 12.5 mm. Also, the inner peripheral edges 23b, 28bB, 34b of the curved portions 23F, 23B, 28, 34F, 34B have a radius R3 of curvature of 10 mm, and the inner peripheral edges 23b, 28bF, 34b have a radius R5 of curvature of 10 mm at portions thereof contiguous to the longitudinal rod portions 21, 27, 32.

Further, in the embodiment, the longitudinal rod portions 21, 27, 32 of the respective linear joining portions 20, 26, 31 have a width dimension B1 of 7 mm for general portions 21a, 27a, 32a on upper sides thereof, and a radius R4 of curvature of 12.5 mm for swelling portions 21b, 27b, 32b at lower ends thereof.

Figure 9:
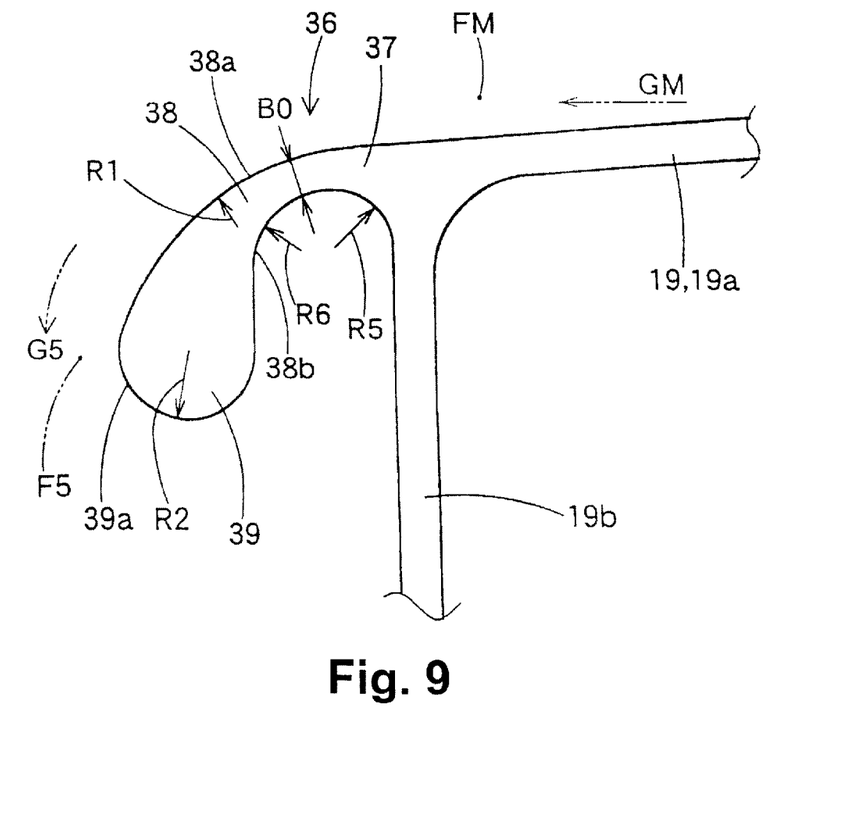
FIG. 9 is an enlarged view showing end portions of still further linear connections in the airbag according to the embodiment.

In addition, a linear joining portion 36 is arranged, as shown in FIG. 9, on a front end side of the compartment 19a of the extended joining portion 19. The linear joining portion 36 comprises a base 37, a curved portion 38 and a swelling portion 39. The base 37 is linear substantially in parallel to the main flow GM of the expansion gas G. The curved portion 38 curves downward toward a forward tip end from the base 37. The swelling portion 39 is disposed on a tip end of the curved portion 38 to connect its outer peripheral edge 39a gently to an outer peripheral edge 38a of the curved portion 38. Dimensions B0, R1, R2, R5 of these respective parts are the same as those of other linear joining portion 31 or the like. Similarly, a longitudinal rod portion 19b of the extended joining portion 19 has the same dimension as those of the longitudinal rod portion 32 of other linear joining portions 31 or the like, and arranges a swelling portion 19c at its lower end. In addition, an inner peripheral edge 38b of the curved portion 38 has a radius R6 of curvature of 15 mm.

These linear joining portions 20, 26, 31 and the longitudinal rod portion 19b are arranged in a manner to make the front-seat and rear-seat expansion portions 14F, 14B substantially uniform in wall thickness when the expansion part 14 permits an expansion gas to flow for expansion. Also, the linear joining portions 20, 26, 31 and the longitudinal rod portion 19b exhibit tensile forces over the front portion of the airbag body 13 from near a tip end of the gas inflowing portion 12. Thus even when subjected to pushing forces toward the outside of the vehicle, the airbag body 13 is prevented from moving toward the outside of the vehicle.

An explanation will be given to loading of the airbag 10 on a vehicle. First, the airbag 10 is manufactured. The airbag 10 is woven by means of hollow-weaving, and cut out into a predetermined shape to be provided with the mount holes 11a and so on. Further, a coating layer is suitably provided to enable manufacturing the airbag 10. Thereafter, the airbag 10 is folded by a predetermined folding machine. This folded state is such that in the embodiment, folds C composed of mountain folds and valley folds are formed to define an accordion fold, in which an airbag lower edge 10b approaches an airbag upper edge 10a.

After folding, the airbag 10 is wrapped by a breakable tape (a character is omitted in the drawings) for prevention of fold collapse. Then the inflator 42 and the brackets 43, 46, 48, 49 are mounted on the airbag 10 to form an airbag assembly. In addition, the breakable tape (a character is omitted in the drawings) is further wrapped around the brackets 48, 49 so as to avoid separation of the airbag 10 and the respective brackets 48, 49.

And the respective brackets 43, 46, 48, 49 are arranged in a predetermined position on the inner panel 2. Then the mount bolts 47 are inserted through the mount holes 11a to be fastened to the inner panel 2, thus fixing the respective brackets 43, 46, 48, 49 to the inner panel 2. That is, the airbag assembly is mounted to the body 1. Then the front pillar garnish 6 and the roof head lining 7 are mounted to the body 1, and the rear pillar garnish 8 and the center pillar garnish 9 are mounted to the body 1, so that the airbag 10 together with the head protective airbag device M is loaded on a vehicle.

After the airbag device M is loaded on the vehicle, the inflator 42 is actuated so that the expansion gas G from the inflator 42 flows into the communicating expansion portion 14C of the expansion part 14 from the gas inflowing portion 12. Then the main flow GM of the expansion gas G is made to branch into the branching flows G1, G2, G3, G4, G5, and the respective branching flows G1, G2, G3, G4, G5 flow to the front-seat expansion portion 14F and the rear-seat expansion portion 14B. Therefore, the expansion part 14 of the airbag 10 begins to expand while eliminating the folds. And the airbag 10 breaks the wrapping tape and pushes open the lids 6a, 7a of the front pillar garnish 6 and the roof head lining 7, so that it expands much in a manner to cover the opening W as shown by two-dot chain lines in FIGS. 1 and 2.

With the airbag 10 in the embodiment, end portions of the linear joining portions 20, 26, 31, 36 on a side near the main flow GM of the expansion gas G are formed in a manner to be made contiguous to the swelling portions 24F, 24B, 29, 35F, 35B, 39 through the curved portions 23F, 23B, 28, 34F, 34B, 38 from the substantially straight bases 22a, 27, 33a, 37. The respective swelling portions 24F, 24B, 29, 35F, 35B, 39 connect the outer peripheral edges 24a, 29a, 35a, 39a smoothly to the outer peripheral edges 23a, 28aB, 34a, 38a of the curved portions 23F, 23B, 28, 34F, 34B, 38. Further, the respective outer peripheral edges 24a, 29a, 35a, 39a have a radius R2 of curvature greater than a width dimension B0 of the respective bases 22a, 27, 33a, 37 contiguous thereto. Therefore, stress concentration is reduced around the respective swelling portions 24F, 24B, 29, 35F, 35B, 39 when the expansion portions 14F, 14B expand.

Also, the outer peripheral edges 23a, 28aB, 34a, 38a of the respective curved portions 23F, 23B, 28, 34F, 34B, 38 have a radius R1, R1B of curvature larger than the radius R2 of curvature of the outer peripheral edges 24a, 29a, 35a, 39a of the respective swelling portions 24F, 24B, 29, 35F, 35B, 39. Therefore, stress concentration is reduced around the respective curved portions 23F, 23B, 28, 34F, 34B, 38.

And at the end portions of the linear joining portions 20, 26, 31, 36 on the side near the main flow GM of the expansion gas G, the respective swelling portions 24F, 24B, 29, 35F, 35B, 39 are made wide. However, at the end portions of the linear joining portions 20, 26, 31, 36 on the side near the main flow GM of the expansion gas G, inner peripheral edges 23b, 28bF, 34b, 38b of the curved portions 23F, 23B, 28, 34F, 34B, 38, which connect the bases and the swelling portions, respectively, are recessed to enable making small the curved portions 23F, 23B, 28, 34F, 34B, 38, the bases 22a, 27, 33a, 37 and the longitudinal rod portions 21, 32 contiguous thereto. Therefore, reduction in volume of the expansion portions 14F, 14B can be held down as much as possible.

Accordingly, with the airbag 10 in the embodiment, the linear joining portions 20, 26, 31, 36 can be arranged without causing breakage of the peripheral wall 15 at the time of development and expansion and with reduction in volume and expansion area held down as much as possible.

Further, with the airbag 10 in the embodiment, the lateral rod portion 33 of the linear joining portion 31 disposed directly opposite to the main flow GM of the expansion gas G to be close to the communicating expansion portion 14C is arranged as shown in FIGS. 5 and 8. That is, the lateral rod portion 33 causes a portion near the curved portion 34B on the base 33a to be arranged substantially in parallel to the main flow GM of the inflowing expansion gas G and the swelling portion 35B to be arranged offset (curved) from the base 33a toward a lower side substantially perpendicular to the main flow GM of the expansion gas G. Therefore, the swelling portion 35B does not directly interfere with the main flow GM of the expansion gas G, and stress concentration can be made further hard to occur around the swelling portion 35B. As a result, it becomes possible to reduce an area of the linear joining portion 31 as well as an area of the swelling portion 35B on the end portions. That is, it becomes possible to increase a volume and expansion area of the airbag 10.

Further, with the embodiment, the respective swelling portions 24F, 24B, 29, 35F, 35B, 39 of the respective linear joining portions 20, 26, 31, 36, respectively, are arranged offset from bases 22a, 27, 33a, 37 and on a side of branching flow passages F1, F2, F3, F4, F5. The branching flow passages F1, F2, F3, F4, F5 branch from a main flow passage FM, through which the main flow GM of the expansion gas G flows, and permit the branching flows G1, G2, G3, G4, G5 to flow therethrough. Therefore, the respective swelling portions 24F, 24B, 29, 35F, 35B, 39 are made further hard to interfere with the main flow GM of the expansion gas G, and stress concentration can be made further hard to occur around the respective swelling portions 24F, 24B, 29, 35F, 35B, 39. That is, it becomes possible to reduce an area of the linear joining portions 20, 26, 31, 36 as well as an area of the swelling portions 24F, 24B, 29, 35F, 35B, 39 on the end portions. And it becomes possible to increase a volume and expansion area of the airbag 10.

Further, with the embodiment, although the airbag 10 is woven by means of hollow-weaving, the outer peripheral edges 23a, 28aF, 28aB, 34a, 38a of the curved portions 23F, 23B, 28, 34F, 34B, 38 on the end portions of the respective linear joining portions 20, 26, 31, 36 have radii R1, R1F, R1B of curvature of 50 mm and 17 mm within the range of 15 to 100 mm. Also, the swelling portions 24F, 24B, 29, 35F, 35B, 39 have a radius R2 of curvature of 12.5 mm within the range of 10 to 15 mm. Therefore, the linear joining portions 20, 26, 31, 36 can be arranged with reduction in volume and expansion area of the airbag 10 held down as much as possible.

Incidentally, in the case where the airbag 10 is formed by means of hollow-weaving, stress concentration is liable to occur around the curved portions at the time of development and expansion provided that the radii R1, R1F, R1B of curvature of the outer peripheral edges 23a, 28aF, 28aB, 34a, 38a of the curved portions are below 15 mm. Also, when the radii R1, R1F, R1B of curvature exceed 100 mm, the degree of bending from the bases decreases, so that the main flow GM of the expansion gas becomes liable to interfere with the swelling portions 24F, 24B, 29, 35F, 35B, 39. And when the curved portions are lengthened so as to avoid this, the airbag 10 will be made small in volume and expansion area. Therefore, it is not preferable that the radii R1, R1F, R1B of curvature exceed 100 mm.

Stress concentration is liable to occur around the swelling portions at the time of development and expansion provided that the radius R2 of curvature of the outer peripheral edges 24a, 29a, 35a, 39a of the swelling portions is below 10 mm. When the radius R2 of curvature exceeds 15 mm, stress concentration is r educed therearound, but the airbag 10 will be made small in volume and expansion area. Therefore, it is not preferable that the radius R2 of curvature exceeds 15 mm.

Also, in the case where there is a need of partially making the airbag compact when the airbag formed in hollow-weaving is to be folded for storage, the airbag may be constituted according to a second embodiment in the following manner.

Figure 10:
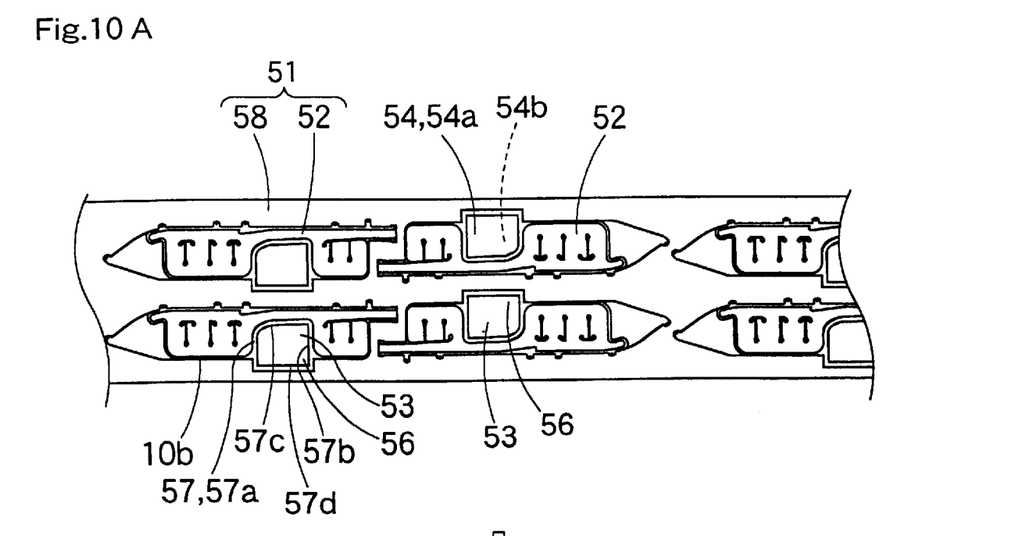
FIGS. 10A, 10B, and 10C are views showing manufacture of an airbag according to another embodiment.
Figure 11:
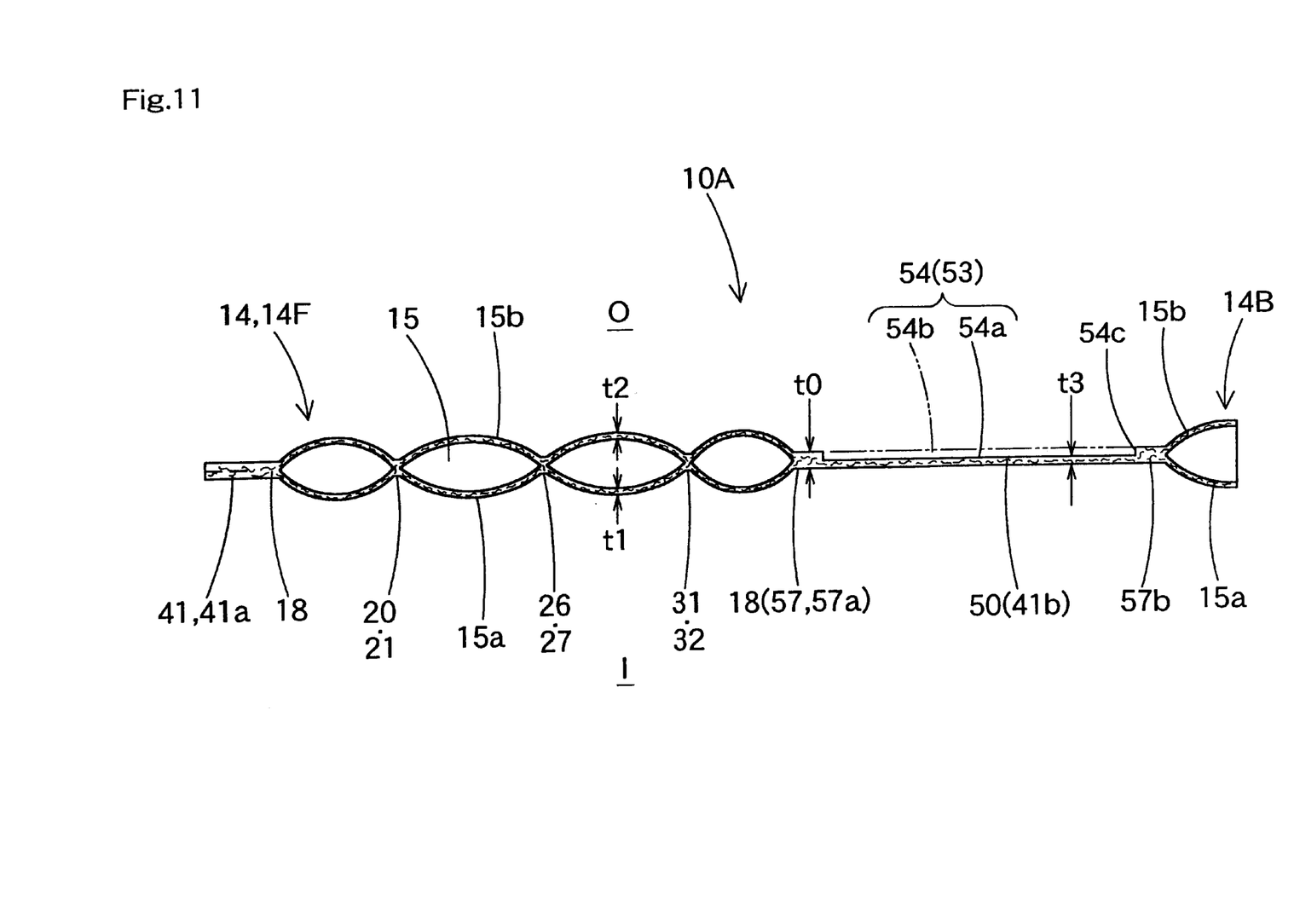
FIG. 11 is an enlarged cross sectional view along the line XI—XI in FIG. 10C.

With the airbag 10A of the second embodiment, shown in FIGS. 10 and 11, the rectangular-plate portion 41b on the non-expansion part 17 of the airbag 10 makes a thin-walled non-expansion part 50. The airbag 10A is constituted in the same manner as the airbag 10 except the thin-walled non-expansion part 50, and so the same parts are designated by the same reference numerals.

The thin-walled non-expansion part 50 is formed thin so as not to become bulky when folded and so as not to interfere with surrounding room lamps (not shown) when stored in the peripheral edges of the opening W. And the thin-walled non-expansion part 50 is formed by cutting off a vehicle-exterior side wall portion 54b of a peripheral wall 54. The peripheral wall 54 together with the expansion part 14 is beforehand subjected to hollow-weaving to be formed in the form of a bag. The thin-walled non-expansion part 50 has its thicknesswise dimension t3 equal to respective thicknesswise dimensions t1, t2 of the vehicle-interior side wall portion 15a and the vehicle-exterior side wall portion 15b (see FIG. 11).

Incidentally, with the embodiment, the thicknesswise dimensions t1, t2, t3 are 0.3 mm, and the peripheral edge joining portion 18 disposed on the peripheral edge of the expansion part 14 has a thicknesswise dimension t0 of 0.6 mm.

A method of manufacturing this airbag 10A comprises first weaving an airbag stock 51 by hollow-weaving as shown in FIG. 10A. The airbag stock 51 is configured to comprise a product-shaped portion 52 constituting a product shape of the airbag 10A and a cut-off hem 58 on a peripheral edge of the product-shaped portion 52. With the embodiment, the airbag stock 51 is woven in a web-like manner with two product-shaped portions 52 arranged side by side in a widthwise direction. In addition, the pairs of two product-shaped portions 52 arranged side by side in the widthwise direction are arranged front side back in a lengthwise direction of the stock 51.

When the stock 51 is to be woven, woven portions 53 of the thin-walled non-expansion part 50 are woven into a bag with a peripheral wall 54, which comprises a vehicle-interior side wall portion 54a and a vehicle-exterior side wall portion 54b. Further, spare bag-shaped portions 56 are woven in a communicating manner over the entire length of the cut-off hem 58 on a side of the airbag lower edge 10b on the bag-shaped woven portion 53.

In addition, peripheries of the bag-shaped woven portions 53 and the spare bag-shaped portions 56 are surrounded by joints 57 to be woven in a closed bag (see FIG. 10A). The joints 57 comprise four portions, that is, a front joint portion 57a on a side of the front-seat expansion portion 14F, a rear joint portion 57b on a side of the rear-seat expansion portion 14B, an upper joint portion 57c on a side of the communicating expansion portion 14C and a lower joint portion 57d on a side of the airbag lower edge 10b.

And after the airbag stock 51 has been woven, laser processing (laser cutting) is used as shown in FIG. 10B to cut boundaries between the product-shaped portions 52 and the cut-off hem 58. At this time, the spare bag-shaped portions 56 are separated from the bag-shaped woven portions 53. Therefore, openings 55 are formed on a side of the airbag lower edges 10b on the bag-shaped woven portions 53.

Then a holder plate 60 serving as a cutting jig is inserted into the bag-shaped woven portion 53 from the opening 55 as shown in FIG. 10C. And laser cutting is made use of to cut off the vehicle-exterior side wall portion 54b of the peripheral wall 54 to form the thin-walled non-expansion part 50. Thereafter, the airbag 10A can be manufactured by providing a coating layer on a surface side.

In addition, the holder plate 60 is arranged so that the vehicle-interior side wall portion 54a is prevented from being cut at the time of laser cutting. Therefore, in the case where a cutter such as scissors or the like is used to cut off the vehicle-exterior side wall portion 54b, the cutting jig such as scissors or the like is inserted directly into the bag-shaped woven portion 53 from the opening 55. And such cutting jig may be used to cut off the vehicle-exterior side wall portion 54b.

Mounting of this airbag 10A on a vehicle is performed by folding the airbag 10A in the same manner as the airbag 10, mounting the inflator 42 and the brackets 43, 46, 48, 49 on the airbag 10A and then mounting the same on a vehicle.

When the airbag 10A is woven by hollow-weaving, the thin-walled non-expansion part 50 together with the expansion part 14 is formed in a bag-shape. The thin-walled non-expansion part 50 is formed by cutting off the portion 54b of the peripheral wall 54 on the woven portion 53, which constitutes the thin-walled non-expansion part 50. That is, with the airbag 10A, only the cutting-off operation after hollow-weaving can form the thin-walled non-expansion part 50. Therefore, it is possible to manufacture the airbag 10A with ease and reduce manhour and cost in manufacture of the airbag 10A.

Also, with the airbag 10A, the thin-walled non-expansion part 50 is constituted by the vehicle-interior side wall portion 54a on the peripheral wall 54 when the airbag is formed by hollow-weaving. That is, the thin-walled non-expansion part 50 is formed by cutting off the vehicle-exterior side wall portion 54b. Therefore, an end portion 54c with the vehicle-exterior side wall portion 54b cut off can be prevented from being exposed to the vehicle-exterior side at the time of development and expansion of the airbag 10A. As a result, it is possible to make feeling favorable even when an occupant contacts with the thin-walled non-expansion part 50.

Further, in the method of manufacturing the airbag 10A, the spare bag-shaped portion 56 communicated to the woven portion 53, which constitutes the thin-walled non-expansion part 50, is formed on an area of the cut-off hem 58 at the time of hollow-weaving. The spare bag-shaped portion 56 can be cut at the time of cutting-off of the cut-off hem 58 to enable formation of the opening 55 on the portion 53 , which constitutes the thin-walled non-expansion part 50. The opening 55 permits the cutting jig 60 to be inserted into the bag-shaped woven portion 53. And the cutting jig 60 can be used to simply cut off the vehicle-exterior side wall portion 54b on the peripheral wall 54 of the bag-shaped woven portion 53. That is, the vehicle-exterior side wall portion 54b can be simply cut off in a state, in which the vehicle-interior side wall portion 54a is not injured and kept clean. Accordingly, with such manufacturing method, it is possible to further simply form the thin-walled non-expansion part 50.

In addition, the thin-walled non-expansion part 50 is formed only at a location in the airbag 10A. However, the plate-shaped joining portion 41 on the other triangular-plate portion 41a may be woven by hollow-weaving to be made thin-walled with the vehicle-exterior side wall portion cut off. In this case, the other plate-shaped joining portion 41 can be made thin to make an airbag lightweight.

In addition, the airbag 10 in the embodiment has been shown as being manufactured by hollow-weaving. However, an airbag may be manufactured with the use of sewing, bonding making use of an adhesive, fusion making use of a high-frequency welder, or the like. And the invention may be applied to linear joining portions provided on the airbag.

Also, with the embodiment, the airbag 10 used in the head protective airbag device M has been explained. However, the invention can be applied to an airbag, in which linear joining portions are arranged, for example, in order to make a thickness of an expansion part at the time of expansion substantially uniform over the entire area, or to compartment an expansion part. Therefore, the invention can be applied to an airbag for use with an airbag device for lateral collision and mounted on a seat, as well as with a head protective airbag device.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims.

What is claimed is:

1. An airbag comprising:
   an expansion part permitting an expansion gas to inflow to expand a peripheral wall; and
   linear joining portions arranged in a region of the expansion part and constituted by joining facing portions of the peripheral wall in a linear manner;

each of the linear joining portions comprising a base, curved portions and swelling portions;

each base being arranged to be substantially straight;

each of the curved portions being connected to the respective base and curvilinearly extending from the respective base thereof;

the swelling portions being arranged at tip ends of the respective curved portions to smoothly connect outer peripheral edges thereof to outer peripheral edges of the curved portions; and the linear joining portions being arranged in accordance with $B0<R2<R1$ where $B0$ is a widthwise dimension near portions of each base connected to the respective curved portions, $R1$ is a radius of curvature of the outer peripheral edges of the curved portions, and $R2$ is a radius of curvature of the outer peripheral edges of the swelling portions.

2. The airbag according to claim 1, wherein the portions of each base near the respective curved portions are arranged substantially in parallel to a main flow of the inflowing expansion gas.

3. The airbag according to claim 1, wherein the swelling portions are arranged offset from the respective base in a direction substantially perpendicular to a main flow of the expansion gas.

4. The airbag according to claim 1, wherein the swelling portions are arranged offset from the respective base toward branching flow passages branching from a main flow passage, through which a main flow of the expansion gas flows.

5. The airbag according to claim 1, wherein the airbag is formed by hollow-weaving.

6. The airbag according to claim 1, wherein the radius of curvature $R1$ of the outer peripheral edges of the curved portions is in the range of 15 to 100 mm, and the radius of curvature $R2$ of the outer peripheral edges of the swelling portions is in the range of 10 to 15 mm.

7. An airbag disposed along a roof side rail portion of a vehicle comprising:

an expansion part permitting an expansion gas to inflow to expand a peripheral wall; and linear joining portions arranged in a region of the expansion part and constituted by joining facing portions of the peripheral wall in a linear manner;

each of the linear joining portions comprising a base, curved portions and swelling portions;

each base being arranged to be substantially straight;

each of the curved portions being connected to the respective base and curvilinearly extending from the respective base thereof;

the swelling portions being arranged at tip ends of the respective curved portions to smoothly connect outer peripheral edges thereof to outer peripheral edges of the curved portions; and the linear joining portions being arranged in accordance with $B0<R2<R1$ where $B0$ is a widthwise dimension near portions of each base connected to the respective curved portions, $R1$ is a radius of curvature of the outer peripheral edges of the curved portions, and $R2$ is a radius of curvature of the outer peripheral edges of the swelling portions;

wherein the portions of each base near the respective curved portions are arranged substantially in parallel to a main flow of the inflowing expansion gas; and the main flow of the inflowing expansion gas is arranged at an upper edge side along the roof side rail portion of the vehicle.

* * * * *